United States Patent [19]

Stedman

[11] 4,174,757
[45] Nov. 20, 1979

[54] MATERIAL RIPPING VEHICLE

[75] Inventor: Robert N. Stedman, Chillicothe, Ill.

[73] Assignee: Caterpillar Tractor Co., Peoria, Ill.

[21] Appl. No.: 839,049

[22] Filed: Oct. 3, 1977

[51] Int. Cl.² .................... A01B 35/14; B62D 55/00
[52] U.S. Cl. ........................... 172/292; 180/9.24 R; 180/9.46
[58] Field of Search ............ 172/292, 297, 781, 307, 172/784, 272, 785, 273, 789, 256, 795, 257, 799, 258, 699, 260; 280/28.5; 180/9.2 R, 9.24 R, 9.44, 9.46, 134–139; 61/72.4, 72.5, 72.6; 37/118 R, 110, 193, 80 R, 88

[56] References Cited

U.S. PATENT DOCUMENTS

| 1,669,345 | 5/1928 | Owens | 180/9.46 |
|---|---|---|---|
| 2,059,261 | 11/1936 | Marshall | 180/9.46 |
| 2,494,324 | 1/1950 | Wright | 172/292 X |
| 2,686,982 | 8/1954 | Leliter | 172/784 |
| 3,253,671 | 5/1966 | Fielding | 180/134 X |
| 3,266,816 | 8/1966 | Peterson et al. | 172/699 X |
| 3,419,097 | 12/1968 | Nodwell et al. | 180/9.46 |
| 3,431,741 | 3/1969 | Kinnan | 61/72.6 |
| 3,435,908 | 4/1969 | Sunderlin et al. | 180/9.44 |
| 3,451,494 | 6/1969 | Kowalik | 180/9.44 X |
| 3,503,456 | 3/1970 | Larson | 172/484 |
| 3,516,260 | 6/1970 | Wood, Jr. | 61/72.6 |
| 3,541,709 | 11/1970 | Comer, Jr. et al. | 37/118 R X |
| 3,581,827 | 6/1971 | Ratcliff | 172/699 X |
| 3,616,553 | 11/1971 | Holland | 37/110 |
| 3,711,970 | 1/1973 | Briar | 37/98 |
| 3,815,683 | 6/1974 | Collin, Jr. et al. | 172/677 |
| 3,859,809 | 1/1975 | Clayhold et al. | 61/72.5 |
| 4,041,623 | 8/1977 | Miller et al. | 180/9.44 X |
| 4,072,203 | 2/1978 | Pierson | 280/28.5 X |

FOREIGN PATENT DOCUMENTS

| 1072709 | 3/1954 | France | 172/292 |
|---|---|---|---|
| 83811 | 9/1964 | France | 172/292 |

Primary Examiner—Paul E. Shapiro
Attorney, Agent, or Firm—Charles E. Lanchantin, Jr.

[57] ABSTRACT

A material ripping vehicle includes first and second traction units, and a frame having an upright pivot axis for steerably connecting the traction units. The second traction unit has a pair of spaced apart ground engaging members and a ripping apparatus is mounted on the frame and positioned between the ground engaging members.

14 Claims, 2 Drawing Figures

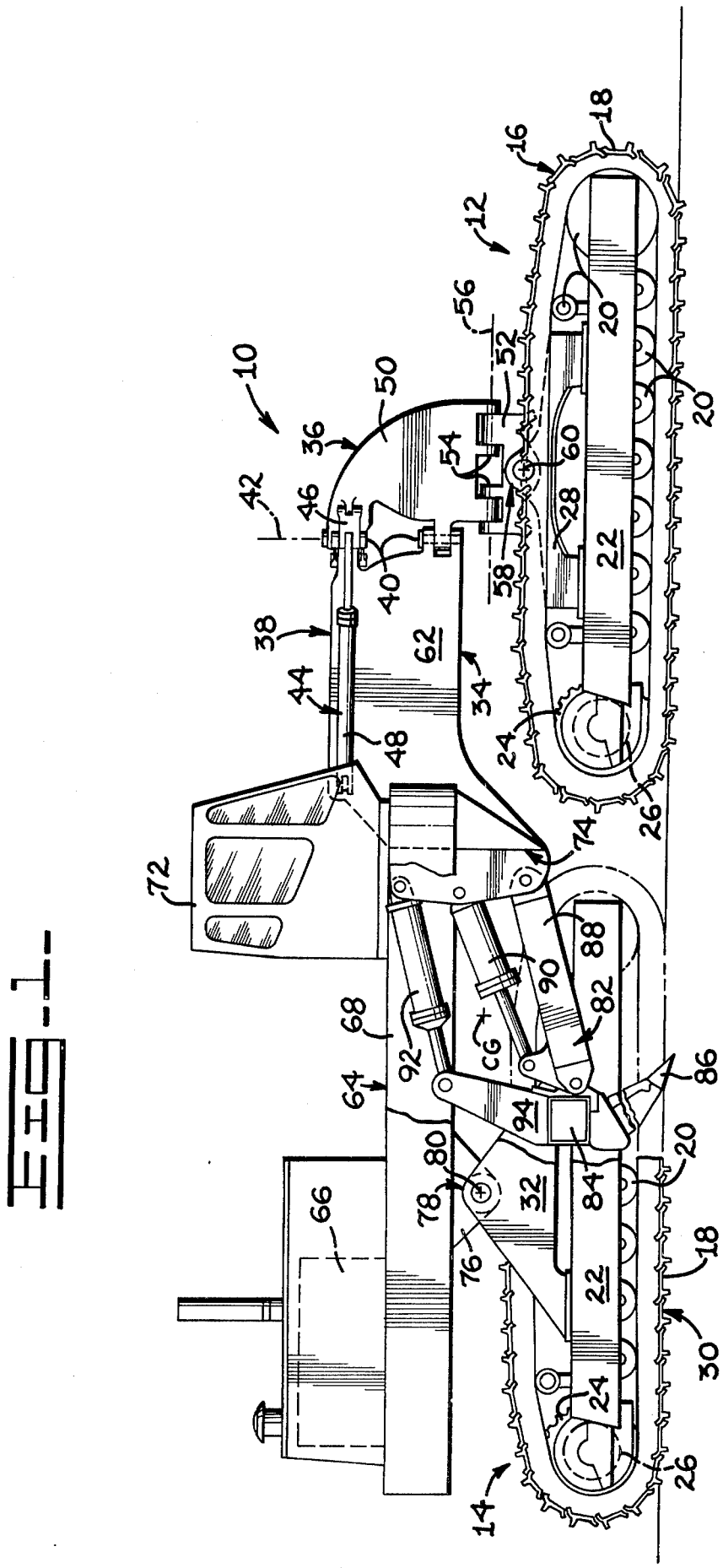

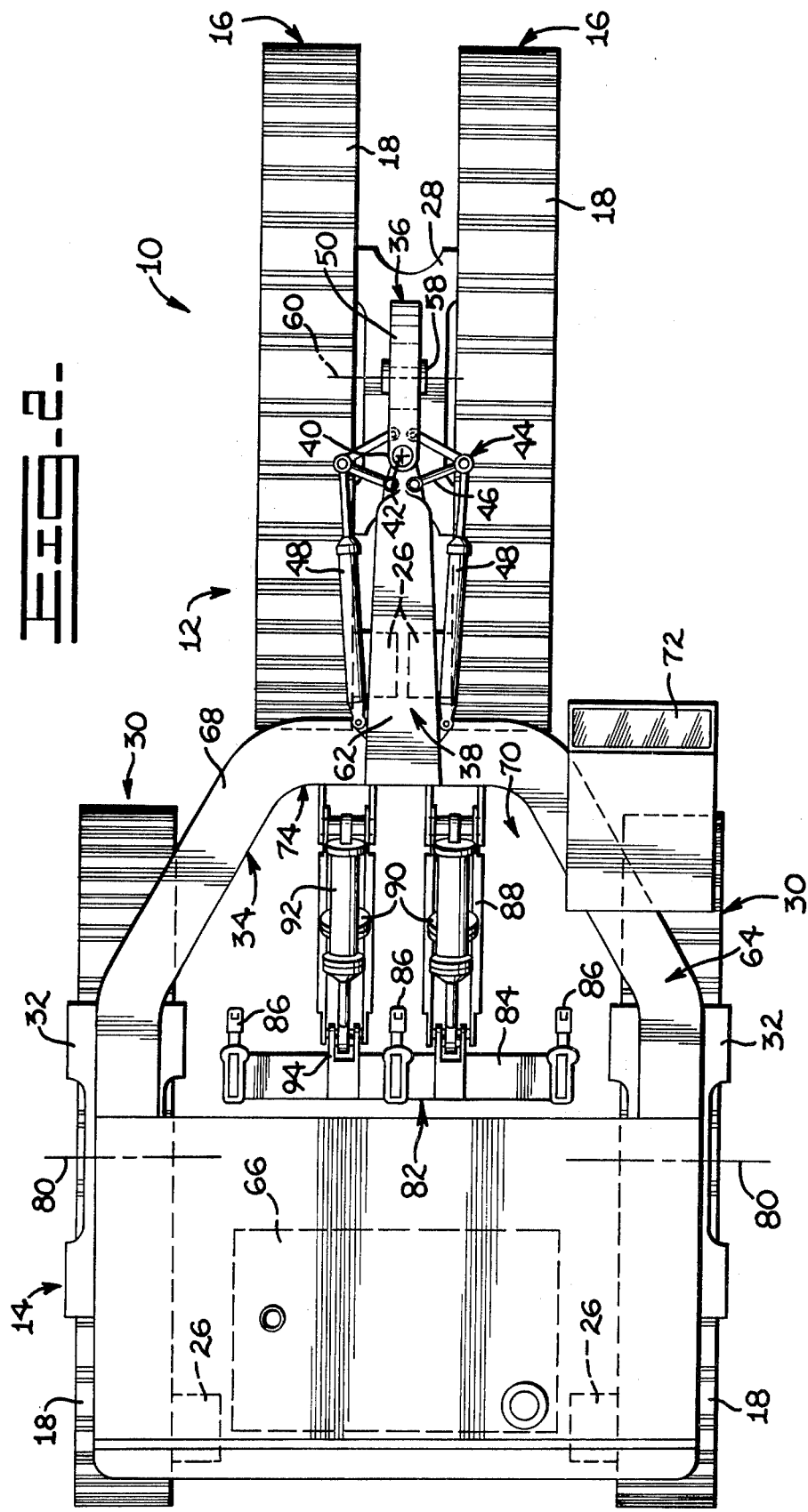

MATERIAL RIPPING VEHICLE

BACKGROUND OF THE INVENTION

The present invention is related to an improved articulated vehicle having a stable rear portion on which an implement such as an earth ripping tool is mounted.

Earth ripping tools are usually secured to the rear wall of various tractors almost as an afterthought. In other words, the tractor is designed somewhat independently of the implement. As a result, the usual ripping tool is not located in an optimum longitudinal location to fully utilize the weight of the vehicle and to achieve maximum penetration of the tool.

Another problem is that the usual ripping tool is poorly located relative to the operator station. Consequently, the vehicle operator often cannot visually observe the action of the tool during normal working conditions.

Still another problem resides in the ability of the machine to steer and maneuver over irregular and soft terrain. Under such difficult circumstances the vehicle must maintain a relatively stable rear work platform for both the operator station and the implement. Unfortunately, current tractor frames experience considerable lateral roll and fore and aft pitching with forward movement thereof. An appreciable portion of the pitching problem is, of course, due to a relatively foreshortened contact pattern between the vehicle and the ground.

SUMMARY OF THE INVENTION

The present invention is directed to overcoming one or more of the problems as set forth above.

According to the present invention there is provided a vehicle including first and second traction units, and a frame having an upright pivot axis for steerably connecting the traction units. The second traction unit has a pair of spaced apart ground engaging members, and a ripping apparatus is mounted on the frame and positioned between the ground engaging members.

The instant vehicle advantageously provides a stable rear portion and a construction especially suitable for mounting of an implement centrally of the rear portion. Furthermore, the vehicle is maneuverable over uneven and soft terrain and includes an operator station so positioned relative to the frame that the implement is visible to the operator.

BRIEF DESCRIPTION OF THE DRAWINGS

FIG. 1 is a diagrammatic side elevational view of the material ripping vehicle of the present invention.

FIG. 2 is a diagrammatic top plan view of the material ripping vehicle of FIG. 1.

DETAILED DESCRIPTION

Referring to both FIGS. 1 and 2, there is shown a material ripping vehicle 10 having a first or front traction unit 12 and a second or rear traction unit 14. It being hereinafter understood that in the normal longitudinal direction of movement the front portion of the vehicle is located at the right when viewing the drawings, and the rear portion is located at the left.

The front traction unit 12 includes a first pair of ground engaging members or track-type undercarriage assembly means 16 for powerably propelling the vehicle. Preferably, each undercarriage assembly means includes an endless track chain 18, a plurality of roller wheels 20 mounted on a track roller frame 22 for supporting the chain, a track driving sprocket 24 for driving the chain, and hydraulic drive motor means 26 for selectively rotating the sprocket in either direction of rotation at the desired speed. As best shown in FIG. 2, the front pair of ground engaging members are connected by a common straddling body 28 so that they are spaced relatively closely together in parallel relation.

The rear traction unit 14 includes a second pair of ground engaging members or track-type undercarriage assembly means 30 which are individually similar to undercarriage assembly means 16 described above and similar reference characters have been applied to the drawings to designate comparable subcomponents. However, the rear pair of ground engaging members are spaced relatively far apart as shown in FIG. 2, and a separate inverted U-shaped body 32 extends upwardly from each of the track roller frames 22 in straddling relation to the respective track chain 18.

The vehicle 10 includes frame means 34 for connecting the front and rear traction units 12 and 14. Particularly, the frame means includes a front frame portion 36 and a rear frame portion 38 articulatably connected together by a steering joint 40 having an upright pivot axis 42. Steering means 44, including a steering linkage assembly 46 connected between the front and rear frame portions and a pair of telescopically extendable actuators or hydraulic jacks 48, are used to swing the front frame portion relative to the rear frame portion about the axis 42 to effect the desired directional change of movement of the vehicle.

As best shown in FIG. 1, the front frame portion 36 has a first or upper part 50 and a second or lower part 52 connected together by an oscillation joint 54 having a longitudinally oriented central pivot axis 56. Advantageously, the lower part 52 is connected to the body 28 by another oscillation joint 58 having a transversely oriented pivot axis 60. In this way each of the front ground engaging members 16 can rock together about the axis 60 in longitudinally oriented upright planes approximately 15 degrees in either direction from a horizontal plane.

Turning now to the construction of the rear frame portion 38, it may be seen to include a deep front beam 62 and an elongated work platform 64 connected to the beam. A vehicle power plant or engine 66 is mounted on the rear of the platform, and forwardly of the engine the platform has a rearwardly facing U-shaped box beam 68 which defines a generously large upright opening 70 through the platform as best shown in FIG. 2. An operator's station 72 is connected to the top of the right front side of the box beam, and a cross frame structure is defined at the bight portion of the U-shaped box beam 68 immediately rearwardly of the front beam 62 as generally indicated by the reference numeral 74.

A bracket assembly or arm 76 extends down from each side of the platform 64 as representatively illustrated in FIG. 1, and each arm is connected to one of the two rear bodies 32 of the rear traction unit 14 by an oscillation joint 78 aligned on transversely oriented pivot axis 80. In this way each of the rear ground engaging members 30 can rock independently of one another about the commox axis 80 in longitudinally oriented upright planes approximately 15 degrees in either direction of rotation from a horizontal plane.

Advantageously, an implement or ripping apparatus 82 is connected to the cross frame structure 74 of the frame means 34 substantially centrally underneath the rear frame portion 38 and between the rear pair of ground engaging members 30. The ripping apparatus is of known construction including an elevatable cross beam 84, one or more earth ripping elements 86 releasably connected to the cross beam at laterally spaced locations, a pair of links 88 pivotally connected between the beams and the cross frame structure, and a pair of extendable actuators or hydraulic jacks 90 pivotally connected between the links and the cross frame structure. Another similar pair of actuators or jacks 92 are pivotally connected to the frame structure and to an upstanding pair of brackets 94 so that the ripping apparatus operates as a true parallelogram-type linkage assembly.

In operation, the jacks 92 of the ripping apparatus 82 are extendable or retractable to change the angle of penetration of the ripping elements 86, whereas the depth of the ripping elements is selected by extension or retraction of the jacks 90. The construction and operation of the instant ripping apparatus is explained in more detail in U.S. Pat. No. 3,503,456 issued Mar. 31, 1970 to D. J. Larson.

In view of the foregoing, it is apparent that the vehicle 10 of the present invention has an improved articulated frame means 34 with the steering axis 42 preferably located at the forward portion of the vehicle longitudinally adjacent to the transverse pivot axis 60 of the front ground engaging members 16. This desirably provides a relatively elongated and more stable work platform 64 at the rear of the vehicle. Moreover, while both the front and rear pairs of track chains 18 provide a substantial degree of contact area with soft ground for improved flotation they are also free to pitch about their respective axes 60 and 80 as the vehicle traverses over irregular terrain. As previously noted, the rear track chains are allowed to pitch independently of one another, and the front track chains pitch together. Also, both front track chains are free to roll as a unit to accomodate operation of the vehicle along side slopes since the second part 52 of the front frame portion 36 is connected to the first pair 50 through the oscillation joint 54.

Another feature of note is that the front track chains 16 are spaced closely together while the rear track chains are spaced apart laterally beyond the front track chains. The close spacing in the front allows the steering effort on a turn to be reduced, and the wide spacing of the rear track chains not only provides improved lateral stability but also permits mounting of an implement between them.

Attention is drawn to the fact that the ripping apparatus 82 may be lowered and raised substantially centrally underneath the rear frame portion 38. With the power plant 66 located at the rear of the vehicle 10 the center of gravity of the entire machine is theorized to be located at about the point designated by the letters CG in FIG. 1. It is, therefore, apparent that, in use, the ripping elements 86 are longitudinally located adjacent to or at the center of gravity to make maximum use of the weight of the vehicle for penetrating material which is difficult to rip. Moreover, the ripping elements are also located laterally between the rear track chains 18 and longitudinally between the front and rear ends of such track chains.

Another advantage of the construction of the vehicle 10 is that the ripper apparatus 82 may be raised fully out of the ground into the opening 70 where it is fully protected by the surrounding rear frame portion 38. When lowered, on the other hand, the offset location of the operator's station 72 adjacent to the opening permits the ripping apparatus to be visually observed for purposes of more precise control.

While the vehicle of the instant example is constructed particularly for the ripping apparatus 82, it is contemplated that other implements can be mounted on the rear work platform 64. For example, log handling equipment or earth drilling equipment can also be supported on the relatively stabilized rear work platform.

Other aspects, objects and advantages will become apparent from a study of the specification, drawings and appended claims.

The embodiments of the invention in which an exclusive property or privilege is claimed are defined as follows:

1. A vehicle (10) having a normal longitudinal direction of travel comprising:
   a front traction unit (12);
   a rear traction unit (14) having a pair of transversely spaced apart track-type undercarriage assembly means (30) for propelling the vehicle (10);
   frame means (34) for steerably connecting said traction units (12,14), said frame means (34) including front and rear frame portions (36,38) connected by a steering joint (40) having an upright pivot axis (42); and
   an earthworking implement (82) mounted on said rear frame portion (38) and positioned substantially transversely between said track-type undercarriage assembly means (30).

2. The vehicle (10) of claim 1 wherein said implement (82) is a ripping apparatus (82).

3. The vehicle (10) of claim 2 wherein said rear frame portion (38) includes a generally U-shaped member (68) having a bight portion (74), and said ripping apparatus (82) is connected to said bight portion (74).

4. The vehicle (10) of claim 3 including an operator station (72) mounted on said rear frame portion (38) of the frame means (34) at a location laterally to one side of said bight portion (74).

5. The vehicle (10) of claim 3 wherein each of said track-type undercarriage assemblies (30) has a rear end, and including a power plant (66) mounted on said rear portion (38) of the frame means (34) at a location rearwardly of said ripping apparatus (82) and substantially transversely between said rear ends thereof.

6. The vehicle (10) of claim 2 wherein said rear frame portion (38) includes a rear work platform (64) and a rearwardly facing U-shaped member (68) connected to said work platform (64) and defining therewith an upright opening (70), at least a portion of said ripping apparatus (82) being retractable into said opening (70).

7. The vehicle (10) of claim 6 including an operator station (72) adjacent said opening (70), said ripping apparatus (82) being visible from said operator station (72).

8. An earth-working vehicle (10) having a longitudinal direction of travel comprising:
   a rear frame portion (38) having an opening (70) vertically therethrough;
   an operator station (72) mounted on said rear frame portion (38) laterally toward a side of said opening (70);
   a pair of track-type undercarriage assemblies (30) connected to and supporting said rear frame portion (38), said undercarriage assemblies (30) being transversely spaced apart and located substantially at either side of said opening (70); and an earthworking apparatus (82) connected to said rear frame portion (38) adjacent said opening (70) and being obliquely rearwardly visible through said opening (70) from said operator station (72).

9. The vehicle (10) of claim 8 including a front frame portion (36), another pair of track-type undercarriage assemblies (16) connected to and supporting said front frame portion (36) laterally adjacent each other, and connecting joint means (40) having an upright pivot axis (42) for steerably coupling said front and rear frame portions (36,38).

10. The vehicle (10) of claim 9 wherein said front frame portion (36) includes an upper part (50), a lower part (52), and second connecting joint means (54) having a central longitudinal and horizontal pivot axis (56) for oscillatably coupling said upper and lower parts (50, 52).

11. The vehicle (10) of claim 8 wherein each of said track-type undercarriage assemblies (30) has a front end, and said earthworking apparatus (82) is located generally transversely between said front ends thereof.

12. A vehicle (10) comprising:
a frame (34) including a rear portion (38) and a front portion (36);
a first pair of track-type undercarriage assemblies (16) connected to said front portion (36);
a second pair of track-type undercarriage assemblies (30) connected to said rear portion (38) and being spaced laterally apart;
an operator's station (72) connected to said rear portion (38);
a power plant (66) connected to said rear portion (38); and
a work implement (82) connected to said rear portion (38) and being located substantially longitudinally between said operator's station (72) and said power plant (66) and substantially laterally between said second pair of track-type undercarriage assemblies (30).

13. The vehicle (10) of claim 12 wherein said rear portion (38) of said frame (34) includes a work platform (64) having a rearwardly facing U-shaped member (68) defining an upright opening (70) through said platform (64), said work implement being visible through said opening (70) from said operator station (72).

14. The vehicle (10) of claim 13 wherein said work implement (82) is a ripper, and including means (90) for raising said ripper at least partially into said opening (70) elevationally above the earth for free travel of the vehicle.

* * * * *